United States Patent [19]
Iwase et al.

[11] Patent Number: 5,146,443
[45] Date of Patent: Sep. 8, 1992

[54] SERVO APPARATUS FOR OPTICAL DISK PLAYER HAVING BOTH OPEN LOOP COARSE GAIN CONTROL AND CLOSED LOOP FINE GAIN CONTROL

[75] Inventors: Munehiko Iwase; Noriyoshi Takeya, both of Tokorozawa, Japan

[73] Assignee: Pioneer Electronic Corporation, Tokyo, Japan

[21] Appl. No.: 592,527

[22] Filed: Oct. 4, 1990

[30] Foreign Application Priority Data

Mar. 13, 1990 [JP] Japan .................................. 2-62423

[51] Int. Cl.⁵ .................................................. G11B 7/00
[52] U.S. Cl. ............................ 369/44.29; 369/44.35; 369/44.36
[58] Field of Search ............ 369/44.25, 44.27, 44.28, 369/44.29, 44.31, 44.35, 44.36, 44.11, 44.34, 44.26; 250/201.1, 201.5

[56] References Cited

U.S. PATENT DOCUMENTS

| | | |
|---|---|---|
| 4,475,182 | 10/1984 | Hosaka .............................. 369/44.36 |
| 4,866,688 | 9/1989 | Ohtake et al. ........................ 369/44 |
| 4,878,211 | 10/1989 | Suzuki et al. ..................... 369/44.35 |
| 4,967,404 | 10/1990 | Orlicki et al. ..................... 369/44.11 |

FOREIGN PATENT DOCUMENTS

| | | |
|---|---|---|
| 0220039 | 4/1987 | European Pat. Off. ......... 369/44.35 |
| 0388519 | 9/1990 | European Pat. Off. ......... 369/44.29 |
| 3643572 | 9/1989 | Fed. Rep. of Germany . |
| 0032225 | 2/1986 | Japan ............................... 369/44.35 |
| 0233431 | 10/1986 | Japan ............................... 369/44.35 |
| 0233435 | 10/1986 | Japan ............................... 369/44.35 |
| 0348233 | 1/1990 | United Kingdom . |
| 0388551 | 10/1990 | United Kingdom . |
| 0388555 | 10/1990 | United Kingdom . |

OTHER PUBLICATIONS

JP-A-63 129 530 Patent Abstracts of Japan vol. 12, No. 338 (p-771) 17 Oct. 1988 (Matsushita Graphic Commun Syst Inc.) 1 Jun. 1988.

Primary Examiner—Roy N. Envall, Jr.
Assistant Examiner—Thang V. Tran
Attorney, Agent, or Firm—Perman & Green

[57] ABSTRACT

A servo apparatus for an optical disk player which coarsely adjusts the loop gain in advance in an open state of a servo loop, and then closes the servo loop to finely adjust the loop gain. This ensures accurate and sure gain control even if there are differences between reflection factors of the recording surfaces of disks being played or is a stain or the like on an objective lens of the player.

7 Claims, 4 Drawing Sheets

SERVO APPARATUS FOR OPTICAL DISK PLAYER HAVING BOTH OPEN LOOP COARSE GAIN CONTROL AND CLOSED LOOP FINE GAIN CONTROL

BACKGROUND OF THE INVENTION

1. Field of the Invention

The present invention relates to a servo apparatus for an optical disk player.

2. Description of the Related Art

Disk players of, for example, optical type which play information-recorded disks, such as a video disk and digital audio disk (hereinafter simply referred to as disk) inevitably require a focus servo apparatus for converging a light beam on the information-recorded surface of a disk to form an information reading light spot and a tracking servo apparatus for permitting the information reading light spot to accurately track record tracks on the disk.

As the focus servo apparatus, there is, for example, a known apparatus employing a so-called astigmatism method, which uses a cylindrical lens to converge light beams as a single light beam in a horizontal direction on one of two points separated on the light path of the light beams and converge the light beams as a single vertical beam on the other point, and generates a focus error signal based on the foursome output of a four-split light detector disposed in the middle of the mentioned two points.

As the tracking servo apparatus, there has been known, for example, an apparatus employing a so-called 3-beam method which arranges three beams, namely, an information reading main beam and two sub-beams for detection of a tracking error, located on the respective sides of the main beam, in such a manner that lines connecting the optical axes of the three beams have predetermined offset angles to the direction of a tangent line to the tracks, and generates an error signal based on the difference between the amounts of light of two sub-beams which have passed the information-recorded surface of a disk.

The loop gains of the servo loops of these servo apparatuses may vary due to a variation in reflection factor, a variation in power of a light beam caused by a stain or the like on an objective lens or a variation in sensitivity of a photosensor in a pickup. This variation in loop gain reduces the follow-up performance with respect to the focus error and tracking error, making it difficult to provide a stable servo operation.

In this respect, an automatic gain control is executed for each disk to acquire the optimal loop gain at the time the disk is played. For instance, in automatically controlling the gain of the focus servo loop of, for example, a video disk player, the loop gain is set in advance lower than the one for the normal playing, and the servo is led in to close the loop before controlling the gain. This control method cannot automatically control the loop gain when the focus servo loop cannot be closed due to a variation in reflection factor of the disk or a stain or the like on the objective lens.

Since a variation in tracking error signal is too large to close the servo loop in the tracking servo apparatus, the p-p value of a tracking error signal (the difference between positive and negative peaks) in an open status is detected and the gain control is executed in accordance with this p-p value. As this method performs the gain control with the servo loop in the open status, it is easily influenced by the eccentricity of the disk and is therefore apt to cause a variation in the control value.

SUMMARY OF THE INVENTION

It is therefore an object of the present invention to provide a servo apparatus for an optical disk player, which can surely and accurately execute automatic control of the loop gain even if there exists a variation in reflection factor of a disk or a stain or the like on an objective lens.

To achieve this object, according to the present invention, there is provided a servo apparatus for an optical disk player, having a signal generator means for generating a predetermined error signal based on an output signal of a pickup for reading recorded information from a disk and including a servo loop controllable to be selectively opened or closed and, in a closed state thereof, driving the pickup based on the error signal, the servo apparatus comprising a loop gain coarse adjustment means for coarsely adjusting a loop gain of the servo loop in an open state thereof; and a loop gain fine adjustment means for finely adjusting the loop gain in the closed state of the servo loop.

According to the servo apparatus for an optical disk player embodying the present invention, the loop gain is coarsely adjusted in advance in the open state of the servo loop, and then the servo loop is set in the closed state to perform a fine adjustment of the loop gain.

DETAILED DESCRIPTION OF THE PREFERRED EMBODIMENTS

Preferred embodiments of this invention will now be described in detail with reference to the accompanying drawings.

Figure 1:
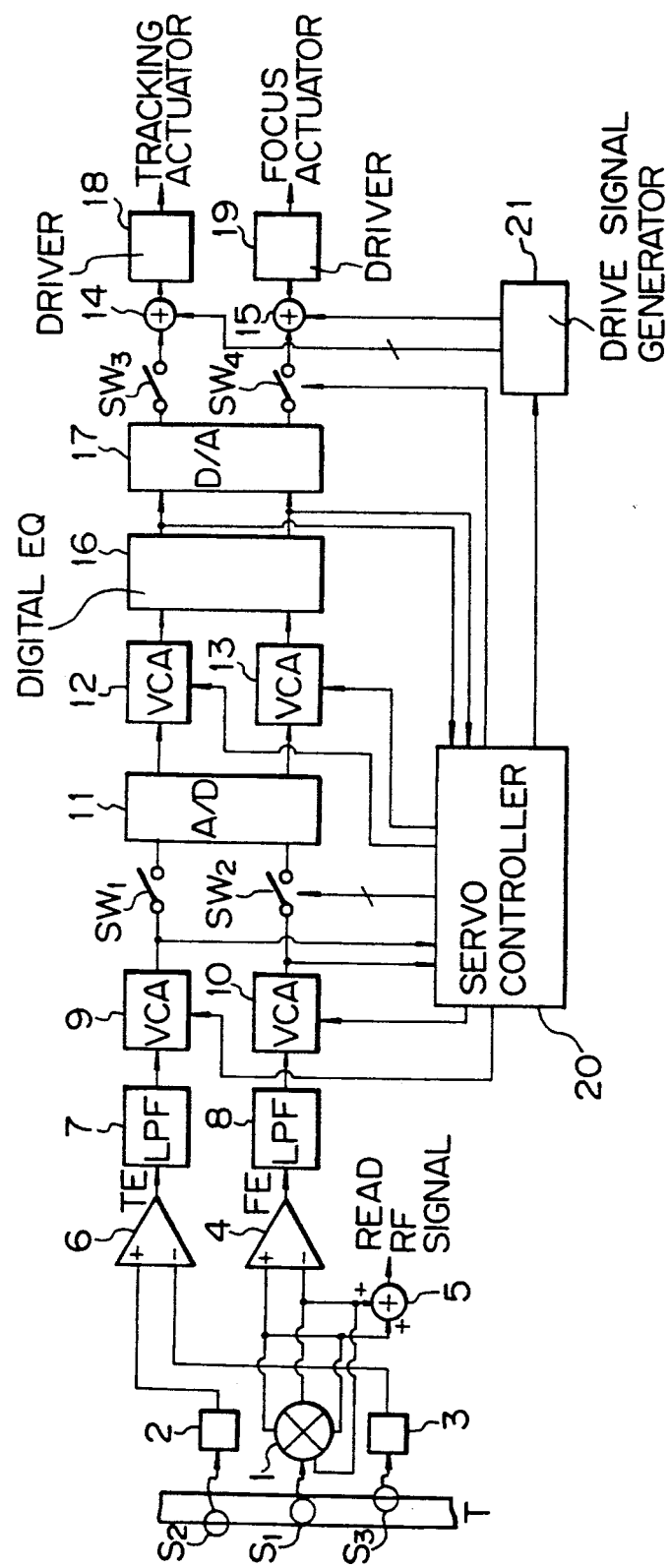
FIG. 1 is a block diagram illustrating the structure of a servo apparatus for an optical disk player according to the present invention.

FIG. 1 is a block diagram illustrating the structure of a servo apparatus for an optical disk player according to the present invention. Referring to this diagram, three beam spots acquired by converging a laser beam, namely, an information reading spot (information reading point) $S_1$ and a pair of tracking error detection spots $S_2$ and $S_3$, respectively preceding and following the spot $S_1$ at the time the spot $S_1$ moves relative to the rotational direction of a disk (not shown), are emitted on a record track T on the disk from a pickup (not shown) with the illustrated positional relationship. The reflection lights from the disk originating from these beam spots respectively enter photoelectric converting elements 1 to 3 incorporated in the pickup to be converted into electric signals. The pickup also has therein a focus actuator for controlling the position of an objective lens in the direction of the optical axis with respect to the information-recorded surface of the disk and a tracking actuator for controlling the position of a beam spot in the radial direction of the disk with respect to the record track T, in addition to an optical system including the objective lens. This pickup is supported by a carriage (not shown) which is freely movable in the radial direction of the disk.

Figure 2:
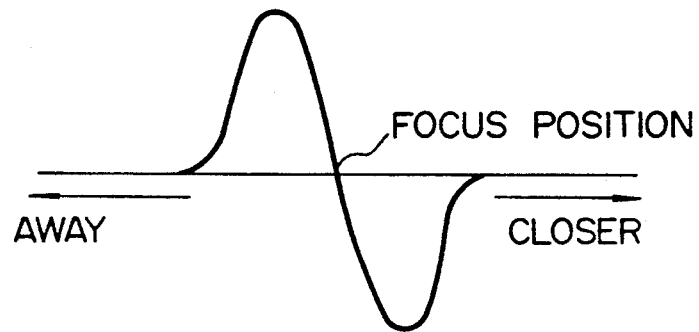
FIG. 2 is a waveform diagram showing a change in waveform of a focus error signal with respect to the distance of an objective lens from the disk surface.

The photoelectric converting element 1 comprises four light receiving elements, which are arranged to have the light receiving surfaces divided into four sections and are dependent of one another. The sum of the outputs of those two light receiving elements which face each other with respect to the center of the light receiving surfaces is sent to a differential amplifier 4, and the sum of the outputs of the other pair of facing elements is likewise sent to the amplifier 4. The amplifier 4 outputs a signal representing the difference between the two sums, this difference signal being a focus error (FE) signal. This focus error signal shows a so-called S curve characteristic which zero-crosses at a focus position with respect to the distance of the objective lens away from the disk surface as the objective lens moves up and down with respect to the focus position, as shown in FIG. 2. The sums of the outputs mentioned above are also supplied to an adder 5 which provides a signal representing the sum of the received sums or a total sum signal of the individual light receiving elements, this total sum signal being a read RF signal.

Figure 3:
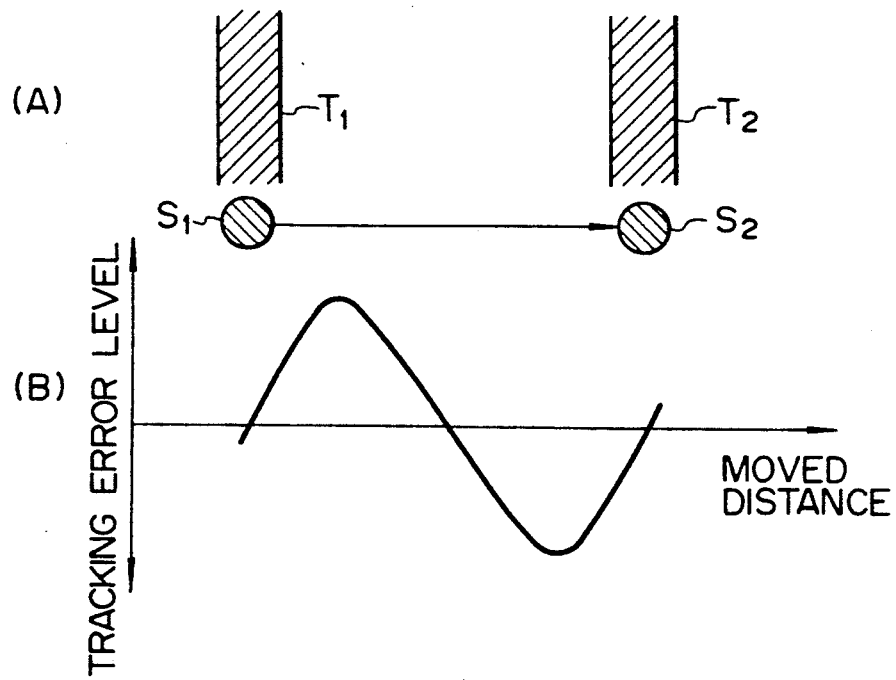
FIG. 3, consisting of (A) and (B), is a diagram illustrating the relation between the positions of information reading spot with respect to record tracks and a tracking error signal.

On the other hand, the outputs of the photoelectric converting elements 2 and 3 are supplied to a differential amplifier 6 which provides a difference signal of the received outputs, this difference signal being a tracking error (TE) signal. With the tracking servo loop in an open state, when the beam spot $S_1$ moves from one record track $T_1$ to an adjoining record track $T_2$ as shown in FIG. 3A, the tracking error signal represents such a waveform as sinusoidal waveform as shown in FIG. 3B. The level of the tracking error signal is proportional to the offset of the beam spot $S_1$ from the record track T and the zero-crossing points correspond to the center of each record track T and to the mid position between tracks.

The tracking error signal and focus error signal are respectively supplied to analog VCAs (Voltage Controlled Amplifiers) 9 and 10 with a variable gain through respective LPFs (Low-pass Filters) 7 and 8 which attenuate the unnecessary frequency components equal to or above the sampling frequency used in A/D (Analog/Digital) conversion to be described later. The gains in the VCAs 9 and 10 are variable roughly in, for example, four stages using two bits. The error signals having passed the respective VCAs 9 and 10 are supplied via select switches $SW_1$ and $SW_2$ to an A/D converter 11 to be digitized. The error signals digitized in the A/D converter 11 are supplied via respective digital VCAs 12 and 13 to a digital equalizer (EQ) 16. The gains in the VCAs 12 and 13 can be finely varied in, for example, 16 stages using four bits. The individual error signals, subjected to compensation for the frequency characteristic in the equalizer 16, are converted into analog signals by a D/A (Digital/Analog) converter 17. The analog signals are then supplied via respective loop switches $SW_3$ and $SW_4$ and adders 14 and 15 adders 14 and 15 to drivers 18 and 19 to be turned into drive signals respectively for the tracking actuator and focus actuator incorporated in the pickup.

The above-described arrangement constitutes digital servo loops for subjecting the individual error signals to A/D conversion for digital processing. Each servo system is controlled by a servo controller 20 comprising a microcomputer. This servo controller 20 controls the OFF(open) and ON (closed) of the loop switches $SW_3$ and $SW_4$ to open and close each servo loop. In addition, with each servo loop in the open state, the servo controller 20 acquires a p-p value of the error signals through the VCAs 9 and 10, which are generated by supplying, for example, sinusoidal wave signals outputted as drive signals from a drive signal generator 21 to the adders 14 and 15, and sets the gains of the VCAs 9 and 10 in accordance with the p-p value to thereby coarsely adjust the loop gain of each servo loop. With each servo loop in the closed state, the servo controller 20 acquires a p-p value of the error signals as inputs to the D/A converter 17, and sets the gains of the VCAs 12 and 13 in accordance with the p-p value to thereby finely adjust the loop gain of each servo loop.

In finely controlling the loop gain, sinusoidal wave signals or the like for forcibly moving the information reading spot $S_1$ in the radial direction of the disk are outputted as drive signals to the adders 14 and 15 from the drive signal generator 21 in the tracking servo system; and sinusoidal wave signals or the like for moving the objective lens up and down with respect to the focus position are outputted as drive signals to these adders from the generator 21 in the focus servo system.

Figure 4:
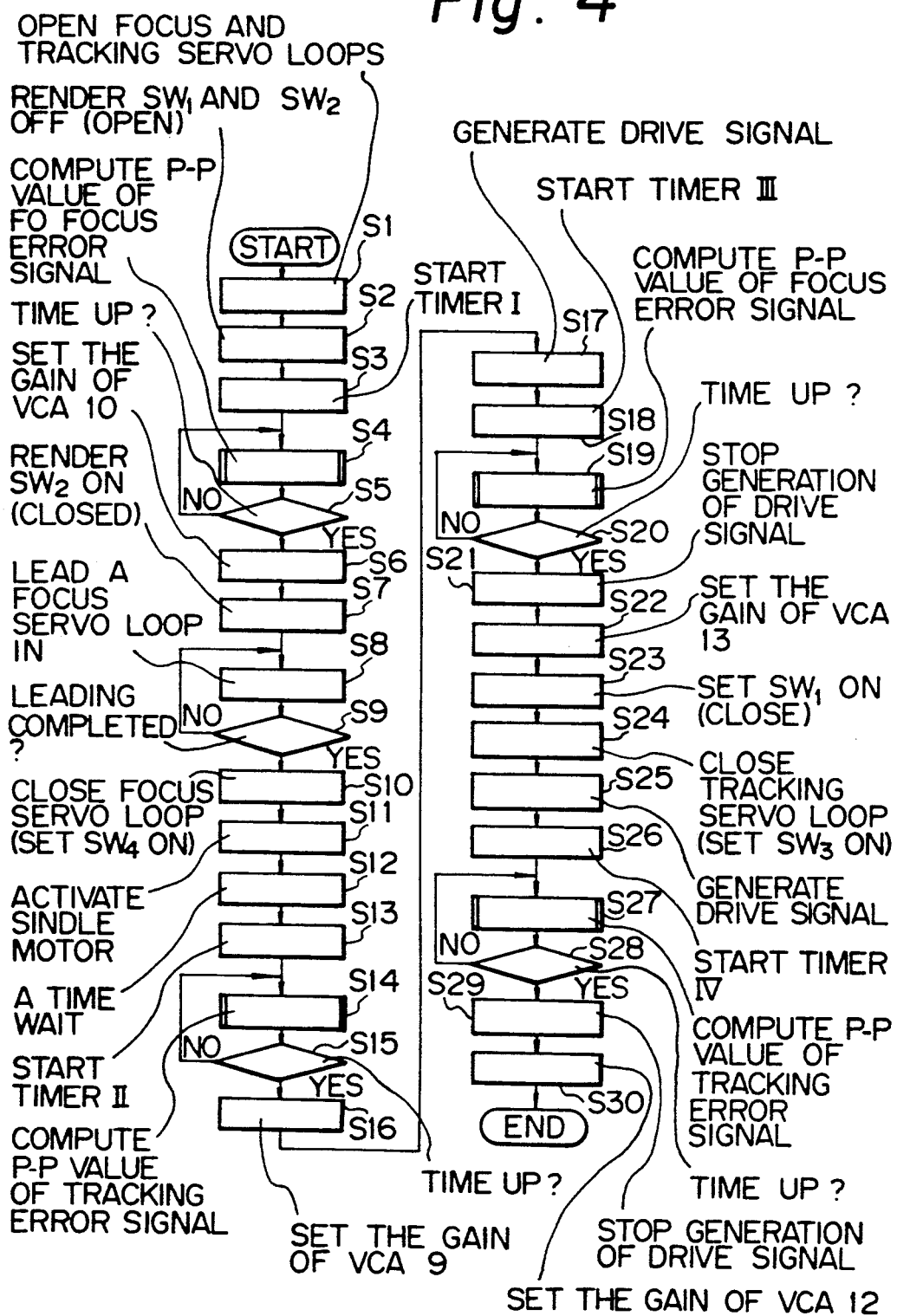
FIG. 4 is a flowchart illustrating procedures for coarse and fine loop gain adjustments.

Next, a sequence of processes executed by the processor of the servo controller 20 for coarse and fine adjustments of the loop gain will be described below referring to the flowchart shown in FIG. 4. It should be noted that this routine is invoked and executed every time a disk is played.

First, the processor renders the loop switches $SW_3$ and $SW_4$ off to set each servo loop in an open state (step S1), renders the select switches $SW_1$ and $SW_2$ off (step S2), starts a timer I set with a predetermined time $T_1$ (step S3), and then repeats a subroutine of latching a focus error signal having passed the VCA 10 to compute its p-p value (step S4) until the time set in the timer I is judged to have elapsed (step S5). Upon elapse of the set time, the processor performs such a control as to set the gain of the VCA 10 to a value corresponding to the p-p value of the focus error signal acquired by the subroutine of step S4 (step S6). Through the above processing, the coarse adjustment of the loop gain of the focus servo loop is completed.

In executing the coarse adjustment of the loop gain of the focus servo loop, since the lens position of the pickup and the reflection position on a disk when the focus servo loop is open vary depending on pickups and disks in use, the objective lens is forcibly moved up and down by a lens drive signal to generate a focus error signal by moving the objective lens upward to the focus position and supplying a disturbance signal such as a sinusoidal wave signal to the lens drive signal.

Next, the processor renders the select switch $SW_2$ on (step S7), leads the focus servo in (step S8), and, when the leading of the focus servo is completed (step S9) then renders the loop switch $SW_4$ on to close the focus servo loop (step S10). Subsequently, the processor activates a spindle motor which is not shown (step S11) and takes a wait time of A (about 200 msec) required for the tracking error signal to be stable (step S12).

The processor then starts a timer II set with a predetermined time $T_2$ (step S13), and then repeats a subroutine of latching the tracking error signal originating from the eccentricity or the like of the disk from the output stage of the VCA 9 and computing its p-p value (step S14) until the time set in the timer II is judged to have elapsed (step S15). Upon elapse of the set time, the processor performs such a control as to set the gain of the VCA 9 to a value corresponding to the p-p value of the tracking error signal acquired by the subroutine of step S14 (step S16). Through the above processing, the coarse adjustment of the loop gain of the tracking servo loop is completed.

In executing the coarse adjustment of the loop gain of the tracking servo loop, the tracking error signal originating from the eccentricity of the disk may be latched in a free state without driving the information reading spot $S_1$. When the eccentricity of the disk is zero, however, the tracking error signal will not be generated, or when the eccentricity if present is small, it takes a great deal of time to latch data. In this respect, therefore, it is practical to apply a disturbance, such as a sinusoidal wave signal, to forcibly vibrate the information reading spot $S_1$, thereby positively generating a tracking error signal.

Next, the processor controls the drive signal generator 21 to apply a sinusoidal wave signal or the like as a disturbance signal, to the drive signal to move the objective lens up and down with respect to the focus position of the disk (step S17), starts a timer III set with a predetermined time $T_3$ (step S18), and then repeats a subroutine of latching a focus error signal at the input stage of the D/A converter 17 and computing its p-p value (step S19) until the time set in the timer III is judged to have elapsed (step S20). Upon elapse of the set time, the processor controls the drive signal generator 21 to stop generating the ramp signal (step S21), and then performs such a control as to set the gain of the VCA 13 to a value corresponding to the p-p value of the focus error signal acquired by the subroutine of step S19 (step S22). Through the above processing, the fine adjustment of the loop gain of the focus servo loop is completed.

The processor then renders the select switch $SW_1$ on (step S23), and then renders the loop switch $SW_3$ on to close the tracking servo loop (step S24). Subsequently, the processor controls the drive signal generator 21 to apply a sinusoidal wave signal or the like as a disturbance signal to move the information reading spot $S_1$ in the radial direction of the disk (step S25), starts a timer IV set with a predetermined time $T_4$ (step S26), and then repeats a subroutine of latching a tracking error signal at the input stage of the D/A converter 17 and computing its p-p value (step S27) until the time set in the timer IV is judged to have elapsed (step S28). Upon elapse of the set time, the processor controls the drive signal generator 21 to stop generating the sinusoidal wave signal (step S29), and then performs such a control as to set the gain of the VCA 12 to a value corresponding to the p-p value of the tracking error signal acquired by the subroutine of step S27 (step S30). Through the above processing, the fine adjustment of the loop gain of the tracking servo loop is completed.

The method of computing the p-p values of the focus error signals in the subroutines of steps S4 and S19 and the method of computing the p-p values of the tracking error signals in the subroutines of steps S14 and S27 may be, for example, those disclosed in Published Unexamined Japanese Patent Application No. Sho-63-106003.

As described above, each servo loop can, without failure, be set in the closed state by coarsely adjusting in advance the loop gain of the servo loop in the open state, so that automatic control of the loop gain in the closed state can be surely and accurately be executed even if there is a variation in reflection factor of the disk or a stain or the like on the objective lens.

Although the above embodiment has been described with reference to a case where the tracking gain is coarsely adjusted after the coarse adjustment of the focus gain, the similar effect may be obtained by conducting the fine adjustment of the focus gain after the coarse adjustment of the focus gain.

In addition, although the VCAs 9 and i0 are provided at the preceding stage of the A/D converter 11 to execute the coarse adjustment of the loop gain in an analog stage in the above-described embodiment, the VCAs 9 and 10 may be provided at the subsequent stage of the A/D converter 11 to coarsely adjust the loop gain in a digital stage.

Further, although a method of computing the amount of control in the coarse adjustment of the VCAs 9 and 10 in the analog stage has been explained in the foregoing embodiment, the same may be computed based on digital data acquired from the output of the A/D converter 11 by rendering the select switches $SW_1$ and $SW_2$ on.

Figure 5:
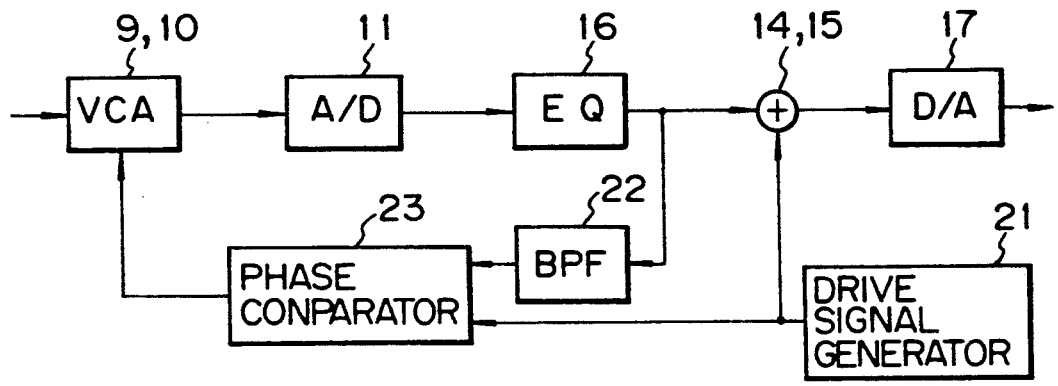
FIG. 5 is a block diagram showing another embodiment of the present invention.

Moreover, although a method of setting the fine adjustment of each loop gain through gain control of the VCAs 9 and 10 based on the p-p value of each error signal has been explained in the foregoing embodiment, a phase comparator 23 may be provided as shown in FIG. 5 to detect the phase difference between a drive signal applied as a disturbance and a disturbance signal extracted from the output of the digital equalizer 16 by a BPF (Band-path Filter) 22, so that the gain control of the VCAs 9 and 10 can be executed in accordance with the phase difference.

The principle of such a gain control will be described below.

Figure 6:
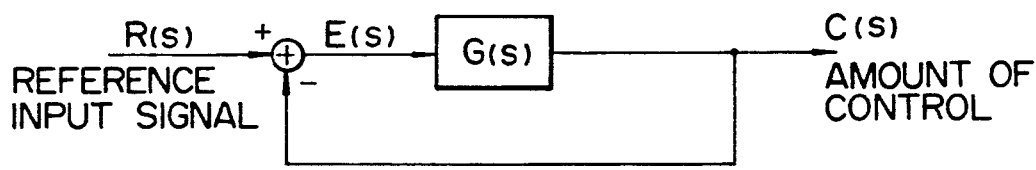
FIG. 6 is a block diagram of a feedback control system.

A simple type of feedback control system is illustrated in the block diagram of FIG. 6 in which R(s) is a reference input signal, C(s) the amount of control, and E(s) an offset or the difference between R(s) and C(s). The feedback control system applies the gain of G(s) based on the E(s), and the transfer function of the closed loop is defined as follows:

$$\frac{C(s)}{R(s)} = \frac{G(s)}{1 + G(s)}$$

Figure 7:
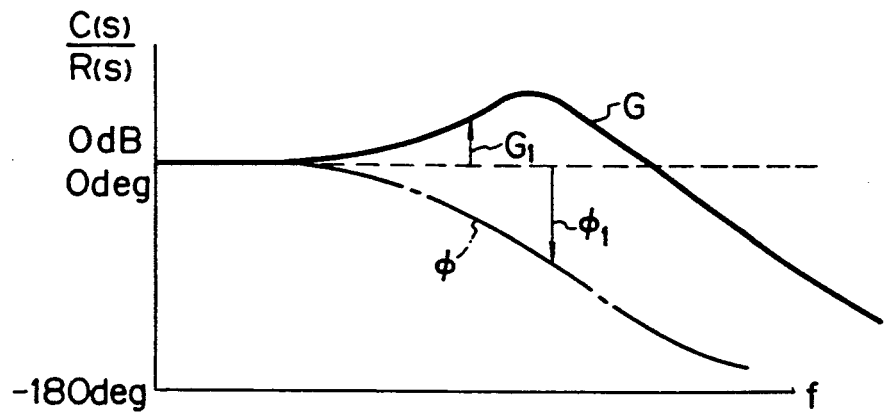
FIG. 7 is a diagram illustrating a transfer characteristic of a closed loop.

In the transfer characteristic of the closed loop, the gain G and phase $\phi$ are defined as follows:

$$G = \left| \frac{C(s)}{R(s)} \right|$$

$$\phi = \tan^{-1} \frac{C(s)}{R(s)}$$

and are illustrated in a graph as shown in FIG. 7.

In the case where the fine adjustment is performed based on the p-p value of the error signal, as the gain for a compact disk is designed to be, for example, 0 dB at 1

KHz according to the closed loop characteristic, for example, the gain is controlled in accordance with the magnitude of the error signal level between the added disturbance signal (e.g., a sinusoidal wave of 1 KHz) and the signal extracted by the BPF 22.

In the case of executing the gain control based on the phase difference instead of the p-p value of the error signal, therefore, each loop gain may as well be finely adjusted by controlling the gains of the VCAs 9 and 10 in such a way that a sinusoidal wave of a specific frequency (e.g., 1.5 KHz) is added as a disturbance in the loop to be added to the output of the equalizer 16 in the closed loop state so as to be reference value (e.g., −90 deg) at the designed value of 1.5 KHz) and the phase difference between the disturbance sinusoidal wave and a disturbance sinusoidal wave extracted from the output of the equalizer 16 by the BPF 22 becomes the reference value (e.g., −90 deg), as shown in FIG. 5.

As described above, the servo apparatus for an optical disk player according to the present invention is designed to execute coarse adjustment of the loop gain in advance in the open state of the servo loop, and then set the servo loop in a closed state to finely adjust the loop gain, so that automatic control of the loop gain can surely and accurately be executed even if there is a variation in reflection factor of a disk or a stain or the like on the objective lens.

What is claimed is:

1. A servo apparatus for an optical disk player, having a signal generator means for generating a predetermined error signal based on an output signal of a pickup that reads recorded information from an information-recorded disk and including a servo loop with amplifier means, said servo loop controllable to be selectively rendered operative for inoperative and, in an operative state, driving the pickup based on the error signal, the servo apparatus comprising:

a loop gain coarse adjustment means connected within said servo loop for coarsely adjusting a loop gain of the servo loop, said loop gain coarse adjustment means rendering inoperative said servo loop and providing feedback for coarsely adjusting a gain of said amplifier means in response to generated error signals; and a loop gain fine adjustment means connected within said servo loop for finely adjusting the loop gain when said servo loop is operative, said loop gain fine adjustment means receiving output from said amplifier means in said coarse adjustment means and including means for providing feedback for fine adjustment of gain of said servo loop.

2. A servo apparatus for an optical disk player according to claim 1, wherein every time an information-recorded disk is played, a servo controller enables an adjustment of said loop gain by operating the loop gain coarse adjusting means and rendering temporarily inoperative the loop gain fine adjusting means.

3. A servo apparatus for an optical disk player according to claim 1, wherein the loop gain coarse adjustment means includes a variable gain amplifier for amplifying an error signal produced by the signal generator means, and a gain control means for detecting an amplitude of the error signal amplified by the variable gain amplifier and controlling a gain of the variable gain amplifier in accordance with a level of the amplitude of the error signal detected.

4. A servo apparatus for an optical disk player according to claim 1, wherein the predetermined error signal is a focus error signal, and wherein the loop gain fine adjustment means includes a variable gain amplifier for amplifying a focus error signal from said amplifier means in said loop gain coarse adjusting means, a means for generating a drive signal to move an objective lens in the pickup up and down with respect to a focus position of the objective lens, and a gain control means coupled to said variable gain amplifier for detecting an amplitude of the focus error signal at a time of driving in response to the drive signal and for controlling a gain of the variable gain amplifier in response to a detected level of amplitude of the focus error signal.

5. A servo apparatus for an optical disk player according to claim 1, wherein the predetermined error signal is a tracking error signal, and wherein the loop gain fine adjustment means includes a variable gain amplifier for amplifying a tracking error signal from said amplifier means in said loop gain coarse adjusting means, a means for generating a drive signal to move an information reading point of the pickup in a radial direction of the disk, and a gain control means coupled to said variable gain amplifier for detecting an amplitude of the tracking error signal at a time of driving in response to the drive signal and for controlling a gain of the variable gain amplifier in response to a detected level of amplitude of the tracking error signal.

6. A servo apparatus for an optical disk player according to claim 1, wherein the predetermined error signal is a focus error signal, and wherein the loop gain fine adjustment means includes a variable gain amplifier for amplifying a focus error signal from said amplifier means in said loop gain coarse adjusting means, a means for generating a drive signal to move an objective lens in the pickup up and down with respect to a focus position of the objective lens, and a gain control means coupled to said variable gain amplifier for detecting a phase difference between the amplified focus error signal at a time of driving in response to the drive signal and the drive signal, and for controlling again of the variable gain amplifier in accordance with the phase difference detected.

7. A servo apparatus for an optical disk player according to claim 1, wherein the predetermined error signal is a tracking error signal, and wherein the loop gain fine adjustment means includes a variable gain amplifier for amplifying a tracking error signal from said amplifier means in said loop gain coarse adjustment means, a means for generating a drive signal to move an information reading point of the pickup in a radial direction of the disk, and a gain control means coupled to said variable gain amplifier for detecting a phase difference between the amplified tracking error signal at a time of driving in response to the drive signal and the drive signal, and for controlling a gain of the variable gain amplifier in accordance with the phase difference detected.

* * * * *